United States Patent
Mahatme et al.

(10) Patent No.: US 12,531,103 B2
(45) Date of Patent: Jan. 20, 2026

(54) MANAGEMENT OF REFRESH OPERATIONS IN AN EMBEDDED DYNAMIC RANDOM ACCESS MEMORIES (DRAMS) HAVING CANARY CELLS

(71) Applicant: NXP USA, Inc., Austin, TX (US)

(72) Inventors: Nihaar N. Mahatme, Austin, TX (US); Anirban Roy, Austin, TX (US)

(73) Assignee: NXP USA, Inc., Austin, TX (US)

( * ) Notice: Subject to any disclaimer, the term of this patent is extended or adjusted under 35 U.S.C. 154(b) by 71 days.

(21) Appl. No.: 18/649,586

(22) Filed: Apr. 29, 2024

(65) Prior Publication Data

US 2025/0336430 A1    Oct. 30, 2025

(51) Int. Cl.
*G11C 11/406* (2006.01)
*G11C 11/4096* (2006.01)

(52) U.S. Cl.
CPC .. *G11C 11/40615* (2013.01); *G11C 11/40622* (2013.01); *G11C 11/4096* (2013.01)

(58) Field of Classification Search
CPC .......................... G11C 11/40615; G11C 11/406
USPC ......................................................... 365/222
See application file for complete search history.

(56) References Cited

U.S. PATENT DOCUMENTS

| | | | |
|---|---|---|---|
| 6,853,598 B2 | 2/2005 | Chevallier | |
| 7,193,901 B2 | 3/2007 | Ruby et al. | |
| 8,711,647 B2 | 4/2014 | Wang | |
| 9,373,418 B2 | 6/2016 | Schreiber et al. | |
| 9,653,142 B1 | 5/2017 | Kihara | |
| 11,468,942 B2 | 10/2022 | Benedict et al. | |
| 2005/0073871 A1* | 4/2005 | Luk | H10B 12/00 257/E27.084 |
| 2006/0203590 A1 | 9/2006 | Mori et al. | |
| 2008/0203443 A1* | 8/2008 | Wilson | H10B 51/00 257/295 |
| 2010/0302888 A1 | 12/2010 | Mori et al. | |
| 2012/0243299 A1 | 9/2012 | Shau | |
| 2015/0187437 A1* | 7/2015 | Schreiber | G11C 29/028 714/718 |
| 2018/0122478 A1* | 5/2018 | Morris | H10B 53/00 |
| 2022/0284944 A1* | 9/2022 | Benedict | G11C 11/403 |

OTHER PUBLICATIONS

Orosa, et al.: "SpyHammer: Using RowHammer to Remotely Spy on Temperature," arXiv:2210.04084v1 [cs.CR] Oct. 8, 2022, pp. 1-15.*

* cited by examiner

*Primary Examiner* — Muna A Techane
(74) *Attorney, Agent, or Firm* — Joanna G. Geld

(57) ABSTRACT

A dynamic random access memory (DRAM) includes a plurality of main bit cells, a first set of write bit lines, a first set of write word lines, a plurality of canary cells, a second set of write bit lines, and a second set of write word lines. Each main bit cell has a capacitive storage element and is coupled to a corresponding write bit line of the first set of bit lines and a corresponding write word line of the first set of write word lines. The plurality of canary cells are configured to be more susceptible to leakage currents as compared the plurality of main bit cells. Each canary cell has a capacitive storage element and is coupled to a corresponding write bit line of the second set of bit lines and a corresponding write word line of the second set of write word lines.

20 Claims, 7 Drawing Sheets

MANAGEMENT OF REFRESH OPERATIONS IN AN EMBEDDED DYNAMIC RANDOM ACCESS MEMORIES (DRAMS) HAVING CANARY CELLS

BACKGROUND

Field

This disclosure relates generally to memories, and more specifically, to managing refresh operations within embedded DRAMs having canary cells.

Related Art

Due to their smaller sizes and improved scaling ability, embedded dynamic random access memories (DRAMs) are emerging as a strong alternative to static random access memories (SRAMs). DRAMs use capacitors as the storage elements, in which a charged capacitor represents a first logic state (e.g. a logic level high) while a discharged capacitor represents a second logic state (e.g. a logic level low). The use of capacitors, though, makes the bit cells of these DRAMs susceptible to data loss due to leakage. The leakage has a wide distribution over the bit cells. While refresh operations can be used to prevent against data loss, the refresh frequency is typically set by the leakiest cell in the tail of the distribution. However, refresh operations add latency as well as increase power consumption. Therefore, a need exists for improved management of refresh operations so as to reduce latency and power consumption.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect, improved refresh management is achieved by implementing canary cells with an eDRAM which are deliberately leakier than the main cells of the DRAM. These canary cells may then be used to indicate impending failures in the main cells. For example, the canary cells can be periodically polled to determine if failure in the leakier cells occurs, which indicates that the main cells are soon expected to fail as well. Therefore, in one embodiment, in response to a failure in the leakier canary cells, a refresh of the main array is performed. The canary cells can be designed such that they reflect the lowest point of a leakage distribution which can no longer be corrected with error correction code (ECC). In one embodiment, the leakier canary cells are designed by setting either the corresponding word lines or bit lines to a higher voltage as compared to those corresponding to the main cells. In another embodiment, the leakier canary cells are designed to have wider transistors or shorter channel lengths. Therefore, the leakier canary cells differ from the main cells by being more susceptible to leakage currents and thus expected to fail sooner as compared to the main cells. By using the leakier canary cells, testing can be performed during manufacture to determine an improved refresh rate. That is, the refresh rate can be set during manufacture by tuning canary cells to identify the failure level below which ECC corrections can happen. In this manner, the refresh rate can be set lower than a worst-case refresh time which would be required without ECC, thus reducing power consumption. Note that the canary cells can be implemented as any portion of a DRAM array or may be located outside the DRAM array.

Figure 1:
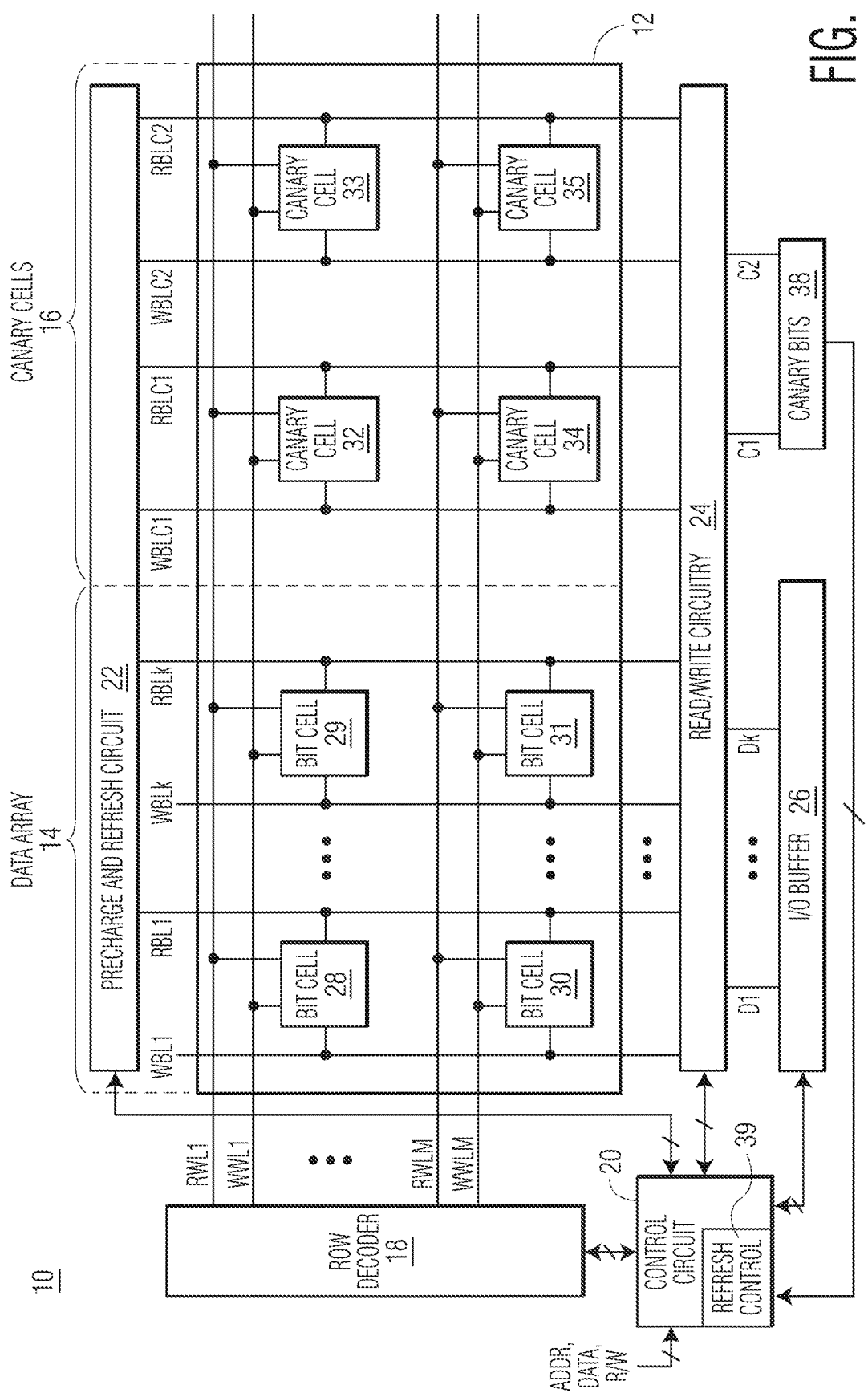
FIG. 1 illustrates, in partial schematic and partial block diagram form, an embedded DRAM capable of use within a data processing system, in accordance with an embodiment of the present invention.

FIG. 1 illustrates, in block diagram form, a memory system 10 (also referred to simply as memory 10), in accordance with one embodiment of the present invention. Memory 10 may be a DRAM which may be embedded within a data processing system, in which the data processing system can be implemented as a system on a chip (SoC). Memory 10 may therefore be referred to as embedded DRAM (eDRAM) 10 or simply DRAM 10. The data processing system can be any type of data processing system having, for example, a processor (which can be any kind of processor such as, for example, a central processing unit (CPU), graphics processing unit (GPU), etc.) in which the processor can access DRAM 10 to perform reads from or writes to the DRAM. The data processing system, in addition to the processor, may include any number and types of elements, such as additional processors or other masters, additional memories, peripherals, I/O devices, etc., in which the elements of the data processing system can be coupled to each other via a system interconnect, such as, for example, a system bus, crossbar switch, fabric, etc. Note that any master of the data processing system may access DRAM 10.

As illustrated in FIG. 1, DRAM 10 includes an array 12 of DRAM bit cells (including, e.g., bit cells 28-35), in which each bit cell is located at an intersection of a corresponding word line and corresponding bit line. Array 12 includes M word lines (WL1-WLM) and k+2 bit lines (BL1-BLK, BLC1, and BLC2) in which each word line is implemented using both a read word line (RWL1-RWLM) and a write word line (WWL1-WWLM), and each bit line is implemented using both a read bit line (RBL1-RBLK, RBLC1, and RBLC2) and a write bit line (WBL1-WBLK, WBLC1, and WBLC2). Also, each of M and k can be any integer equal to or greater than one. Array 12 is divided into a main array portion (main array 14) and a canary cells portion (canary cells 16), in which BL1-BLk correspond to the bit lines used by main array 14 and BLC1 and BLC2 correspond to the bit lines used by canary cells 16. In the illustrated embodiment, the M write word lines of array 12 extend through both the main array and canary cells. WWL1-WWLM are shared by the main array and canary cells. In an alternate embodiment, as will be discussed below, the word lines may be separated between the main array and the canary cells, such that the word lines of the main array can be controlled separately from those of the canary cells.

Main array 14 includes a plurality of DRAM bit cells (e.g. bit cells 28-31) in which each bit cell (also referred to as a main bit cell or main cell) is located at the intersection of a corresponding word line (RWL/WWL) and a corresponding bit line (RBL/WBL) of main array 14. Each bit cell of main array 14 is therefore coupled to a corresponding RWL of RWL1-RWLM, WWL of WWL1-WWLM, RBL of RBL1-RBLk, and WBL of WBL1-WBLk. Canary cells 16 includes a plurality of DRAM bits cells (e.g. bit cells 32-35, which are also referred to as canary cells 32-35) in which each canary cell is located at the intersection of a corresponding word line (RWL/WWL) and a corresponding bit line (RBLC/WBLC). Each canary cell of canary cells 16 is therefore coupled to a corresponding RWL of RWL1-RWLM, WWL of WWL1-WWLM, RBLC of RBLC1-RBLC2, and WBLC of WBLC1-WBLC2. In the illustrated embodiment, canary cells 32-35 are implemented in an array which includes M rows (like the main array) and two columns. However, as will be described below, canary cells 16 can include one or more columns, and canary cells 16 can be implemented as a different portion of array 12. For example, instead of including one or more columns of array 12 (located at the far right or far left of array 12 or located between any columns of array 12, in which the one or more columns may or may not be immediately adjacent each other), canary cells can be implemented as one or more rows of array 12 (located at the very top or very bottom of array 12 or located between any rows of array 12, in which the one or more rows may or may not be immediately adjacent each other), or can be an array or group of cells that is separate from array 12. Each bit cell of array 12, including those of main array 14 and canary cells 16, includes a capacitor (i.e. capacitive storage element), a write select transistor (i.e. write access transistor), and a read select transistor (i.e. read access transistor) and is coupled to a corresponding word line and corresponding bit line, the details of which will be described in reference to FIG. 2 below.

DRAM 10 also includes a row decoder 18 coupled to the rows of array 12 via word lines (RWL1-RWLM and WWL1-WWLM), read/write circuitry 24 coupled to columns of array 12 via bit lines (RBL1-RBLK, RBLC1, RBL2 and WBL1-WBLK, WBLC1, WBLC2), an input/output (I/O buffer) 26, a canary bits storage circuit 38 (which may also simply be referred to as canary bits 38), a precharge and refresh circuit 22 coupled to the bit lines of array 12, and a control circuit 20 coupled to row decoder 18, read/write circuitry 24, and I/O buffer 26. Control circuit 20 also includes a refresh control circuit 39. An access request to DRAM 10 can be a read access request or a write access request and includes an access address (ADDR), write data (DATA) if the access request is a write request, and control information such as a R/W indicator to indicate whether the access request corresponds to a read or write access. Control circuit 20 receives ADDR, DATA, and R/W, and provides control signals accordingly to row decoder 18, read/write circuitry 24, and I/O buffer 26, as needed, to perform the requested access request. In one example, control circuit 20 provides ADDR to row decoder 18 which activates a selected word line of RWL1-RWLM (for a read) or of WWL1-WWLM (for a write) based on ADDR.

In the case of a write access, capacitors of selected bit cells along the selected row (coupled to the selected word line) are charged or discharged by read/write circuitry 24, in accordance with the corresponding write data, to properly store a logic one or logic zero, respectively, in each selected DRAM cell. For main array 14, the corresponding write data is received as D1-Dk by read/write circuitry 24 from control circuit 20 via I/O buffer 26. For canary cells 16, the write data is always either a logic one or a logic zero (as selected, e.g., during manufacture), in which a same logic state (the selected logic one or logic zero) is always written to any of the canary cells, as will be described in more detail below. The charging/discharging of the capacitor in each selected DRAM bit cells is done via a corresponding bit line and select transistor. For a read access, charges on the capacitors along the selected row are sensed by corresponding sense amplifiers in read/write circuitry 24 to determine the stored states of the select row (provided as D1-Dk by read/write circuitry 24 for main array 14 and as canary bits C1 and C2 for canary cells 16), in which the stored states corresponding to D1-Dk are latched into I/O buffer 26 such that they can be returned as read data and the stored states corresponding to C1 and C2 are stored in canary bits 38 such that they can be returned to refresh control circuit 39. In one embodiment, prior to a read access, the bit lines of array 12 are precharged by refresh and precharge circuit 22.

Since DRAMs, such as DRAM 10, use capacitive storage in each bit cell, the DRAM is susceptible to data loss due to leakage. Therefore, refresh operations are performed to reinforce the stored states in the bit cells of the DRAM to prevent data loss. In the illustrated embodiment, refresh operations are controlled by refresh control circuit 39 and can be performed by refresh and precharge circuit 22. Refresh operations are performed on data array 14 as well as canary cells 16. That is, in one embodiment, when a refresh is performed for array 12, it is performed for both data array 14 and canary cells 16. Each refresh operation can be performed, as known in the art, such as by, for each address of DRAM 10, reading the stored values from array 12 and subsequently writing those stored values back to array 12.

As mentioned above, leakage among the bit cells of a DRAM have a wide distribution, therefore, typically, in a DRAM without canary cells, the refresh rate is set by the leakiest cells in the tail of the distribution. This refresh rate may be referred to as the "worst case" refresh rate, and is costly in terms of power consumption and latency (in which the higher the refresh rate, the costlier in terms of power consumption and latency), but the "worst case" refresh rate ensures that data loss is prevented even in the leakiest cells of the array. Further, the "worst case" refresh rate may be used to prevent data loss without the use of any ECC. However, as will be described in more detail below, canary cells 16 can be used to allow a lower refresh rate. This lower refresh rate can be determined during manufacture by using canary cells 16, in which the refresh operations of DRAM 10 are controlled by refresh control circuit 39 in accordance with this lower refresh rate initially set during manufacture. The refresh rate can be stored, for example, in storage circuitry within refresh control circuit 39. In one embodiment, during operation in the field, refresh control circuit 39 may perform unscheduled refreshes or may update the refresh rate in response to canary bits 38 read from canary cells 16.

In one embodiment, each of canary cells 16 is designed to be deliberately leakier than the bit cells of main array 14 (also referred to as the main cells) so that they may be used to set the initial refresh rate during manufacture and so that they may also, during use in the field, warn of impending failure of the main cells. For example, in one embodiment, the canary cells have controllable biases to increase the leakage relative to the leakage distribution of the main cells in which the canary cells can be tuned to match the failure level which can be corrected by ECC. In this manner, the refresh rate can be reduced as compared to the "worst case" refresh rate.

Note that, although not illustrated in FIG. 1, DRAM 10 is coupled to a first voltage supply node configured to supply a first supply voltage, VDD, and a second voltage supply node configured to supply a second supply voltage, VSS, in which VDD is greater than VSS. In one embodiment, VSS is ground. Also, note that each of the first and second voltage supply nodes may simply be referred to herein by the corresponding supply voltages VDD and VSS, respectively. As will be described in reference to FIG. 2, each of the bit cells of DRAM 10 is implemented as a 3T DRAM cell, including 3 transistors. However, alternate embodiments may use other types of DRAM bit cells, such as a 1-transistor 1-capacitor (1T1C) DRAM bit cell, 2-transistor (2T) DRAM bit cell or a 4-transistor (4T) DRAM bit cell. Regardless of the type of DRAM bit cell in DRAM 10, each DRAM bit cell is structured the same, in which a charged capacitor represents a first logic state (e.g. a logic level high) while a discharged capacitor represents a second logic state (e.g. a logic level low). Alternatively, a charged capacitor may represent the logic level low state and a discharged capacitor the logic level high state.

Figure 2:
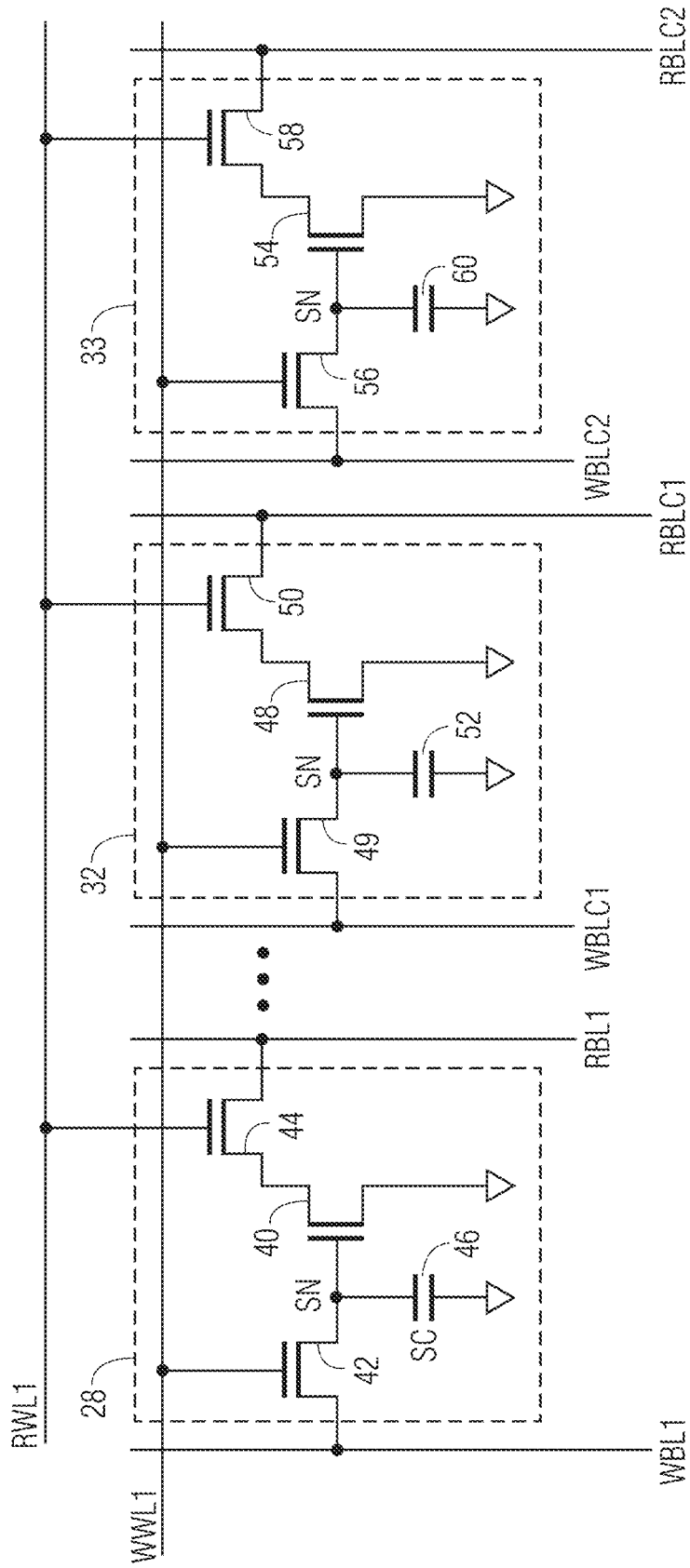
FIG. 2 illustrates, in schematic form, a data bit cell and a canary bit cells of the DRAM of FIG. 1, in accordance with an embodiment of the present invention.

FIG. 2 illustrates, in schematic form, a bit cell and canary cells located in a first row of DRAM 10, in accordance with an embodiment of the present invention. The illustrated first row of FIG. 2 corresponds to the first (i.e. top) row of DRAM 10 of FIG. 1, and includes bit cell 28 (also referred to as main cell 28), canary cell 32, and canary cell 33, RWL1, WWL1, RBL1, WBL1, WBLC1, RBLC1, WBLC2, and RBLC2. Bit cell 28 includes a storage capacitor SC 46 coupled to a storage node labeled SN, a storage transistor 40, a write access transistor 42, and a read access transistor 44. Transistor 40 has a control electrode coupled to SN, a first current electrode, and a second current electrode coupled to VSS. Note that although SC 46 is illustrated as an explicit capacitor, it may represent a parasitic capacitance of cell 28, such as a gate capacitance of transistor 40 and diffusion capacitance of transistor 42. Transistor 42 has a control electrode coupled to a corresponding word line of the first row (WWL1), a first current electrode coupled to a corresponding bit line (WBL1), and a second current electrode coupled to SN. Transistor 44 has a control electrode coupled to a corresponding word line of the first row (RWL1), a first current electrode coupled to the first current electrode of transistor 40, and a second current electrode coupled to a corresponding bit line (RBL1). In the illustrated embodiment, each transistor in bit cell 28 is an n-channel metal-oxide semiconductor (NMOS) transistor. However, in alternate embodiments, a cell may be constructed using p-channel metal-oxide semiconductor (PMOS) transistors or a combination of NMOS and PMOS transistors.

In operation, bit cell 28 stores a first logic state (e.g. logic level one) when SC 46 is charged and a second logic state (e.g. logic level zero) when SC 46 is discharged. For a write to bit cell 28, row decoder 18 activates the corresponding write word line (WWL1) by applying a write voltage (e.g. a VDD pulse) onto WWL1. This results in turning on transistor 42. If writing a logic level one, read/write circuitry 24 provides VDD (as a pulse) onto the corresponding write bit line (WBL1) such that SC 36 is charged via WBL1 and transistor 42. If writing a logic level zero, read/write circuitry 24 couples WBL1 to VSS (as a pulse) which discharges SC 46 via transistor 42 and WBL1. (Note that during a write, the corresponding read word line, RWL1, is set to VSS so as to turn off transistor 44.) After a write, prior to performing any read from data array 14, the read bit lines (RBL1-RBLk) are precharged to a precharge voltage (e.g. VDD) by precharge and refresh circuit 22. In one embodiment, the read bit lines are precharged to VDD via an NMOS transistor (in which case the precharge voltage is about VDD or "VDD-Vt"). Alternatively, other precharge levels may be used. For a read from a selected cell of data array 14, the value on the corresponding WBL can be interpreted as the value of BL, while the value on the corresponding RBL can be interpreted as the value of BLbar (i.e. the inverse of BL).

Therefore, for a read from bit cell 28 (in which RBL1 is precharged to VDD), row decoder activates the corresponding read word line (RWL1) by applying a read voltage (e.g. VDD) onto RWL1, which turns on transistor 44 (while setting WWL1 to zero so as to turn off transistor 42). If, during a read from bit cell 28, a logic level zero is currently stored such that SC is in a discharged state, transistor 40 is held off and RBL1 is maintained at its precharged level (about VDD or VDD-Vt). RBL1 remaining at about VDD is interpreted by read/write circuitry 24 as corresponding to a logic level 0 (e.g., if RBL1=BL1bar=1, then BL1=0). If, however, a logic level one is currently stored such that SC 46 is fully charged, transistor 40 is on which provides a discharge path from RBL1 to VSS, thus pulling RBL1 to VSS. This is interpreted by read/write circuitry 24 as corresponding to a logic level 1 (e.g., if RBL1=BL1bar=0, then BL1=1). Note that the description of operation for bit cell 28 applies analogously to the other bit cells of DRAM 10.

Still referring to FIG. 2, canary cells 32 and 33 correspond to bit cells which operate analogously to bit cell 28 but are designed such that they are more susceptible to leakage as compared bit cell 28. Each of canary cell 32 and 33, during operation, will store the same selected logic state (either a logic level 0 or logic level 1). Canary cells 32 and 33 include elements analogous to bit cell 28, in which the connectivity and functionality of the elements in the reference cells are analogous to those of bit cell 28. Canary cell 32 includes a storage capacitor SC 52 coupled to a storage node labeled SN, a storage transistor 48, a write access transistor 49, and a read access transistor 50. Transistor 48 has a control electrode coupled to SN, a first current electrode, and a second current electrode coupled to VSS. Note that, as with any bit cell, although SC 52 is illustrated as an explicit capacitor, it may represent a parasitic capacitance of cell 32. Transistor 49 has a control electrode coupled to a corresponding word line of the first row (WWL1), a first current electrode coupled to a corresponding bit line (WBLC1), and a second current electrode coupled to SN. Transistor 50 has a control electrode coupled to a corresponding word line of the first row (RWL1), a first current electrode coupled to the first current electrode of transistor 48, and a second current electrode coupled to a corresponding bit line (RBLC1). Similarly, reference cell 33 includes a storage capacitor SC 60 coupled to a storage node labeled SN, a storage transistor 54, a write access transistor 56, and a read access transistor 58. Transistor 54 has a control electrode coupled to SN, a first current electrode, and a second current electrode coupled to VSS. Note that, as with any bit cell, although SC 60 is illustrated as an explicit capacitor, it may represent a parasitic capacitance of cell 33. Transistor 56 has a control electrode coupled to a corresponding word line of the first row (WWL1), a first current electrode coupled to a corresponding bit line (WBLC2), and a second current electrode coupled to SN. Transistor 58 has a control electrode coupled to a corresponding word line of the first row (RWL1), a first current electrode coupled to the first current electrode of transistor 54, and a second current electrode coupled to a corresponding bit line (RBLC2). In the illustrated embodiment, each transistor in reference cell 32 and reference cell 33 is also an NMOS transistor, but alternatively a canary cell can include PMOS transistors or a combination of NMOS and PMOS transistors.

During a read operation from selected bit cells of main array 14 (i.e. from bit cells addressed by the received access address), sense amplifiers within read/write circuitry 24 can determine the difference between a stored one and stored zero by performing a single comparison to compare the voltage on the corresponding RBL to an ideal reference. For example, the ideal reference may be a voltage which always fall between a sensed voltage on the RBL when a stored "one" is read and a sensed voltage on the RBL when a stored "zero" is read. However, over time, with each subsequent refresh of array 12, the sensed voltage of the RBL changes such that, for example, the sensed voltage on the RBL when a stored "one" is read increases over time, while the sensed voltage on the RBL when a stored "zero" is read decreases over time, decreasing the voltage margins for distinguishing between stored "ones" and "zeros," resulting in possible read errors. These changes over time occur due to increased leakage currents of the bit cells which prevents a bit cell from remaining at a fully discharged state (for a stored 0) or fully charged state (for a stored 1). Further, as the voltage margins decrease, the required refresh rate of the DRAM bit cells increases (since refreshes are needed sooner to prevent data loss), which results in increased latency and power consumption.

Canary cells 16 are designed such that they are more susceptible to leakage as compared to the cells of main array 14, meaning the retention time for canary cells 16 is less than those of main array 14, and therefore, at the same refresh rate, they will fail prior to those of main array 14. In one embodiment, as the bias voltage on WBL increases, the leakage on the corresponding storage node SN of the bit cell increases, thus reducing retention time. Similarly, the bias voltage on WWL (at the gate of the access transistor) also has a strong impact on leakage in which leakage increases as the bias voltage on WWL increases, thus reducing retention time. Therefore, each of canary cells 16 can be tuned by either increasing the bias on WBLC1 and WBLC2 or increasing the bias voltage on the gates of the access transistors of the bias cells. The former can be achieved by read/write circuitry 24 being able to independently provide multiple voltage values to the WBLCs which are different than those applied to the WBLs. The latter can be achieved by segmenting the write word lines of main array 14 from the write word lines of canary cells 16. In this case, referring to FIG. 2, WWL1 would not be coupled to the gates of access transistors 49 and 56, but instead, increased bias voltages (as compared to the voltage on WWL1) can be applied by row decoder 18 to the gates of the access transistors via a separate set of write word lines for the canary cells. In other embodiments, the dimensions of the transistors within the canary cells can be altered to increase susceptibility to leakage currents.

Figure 3:
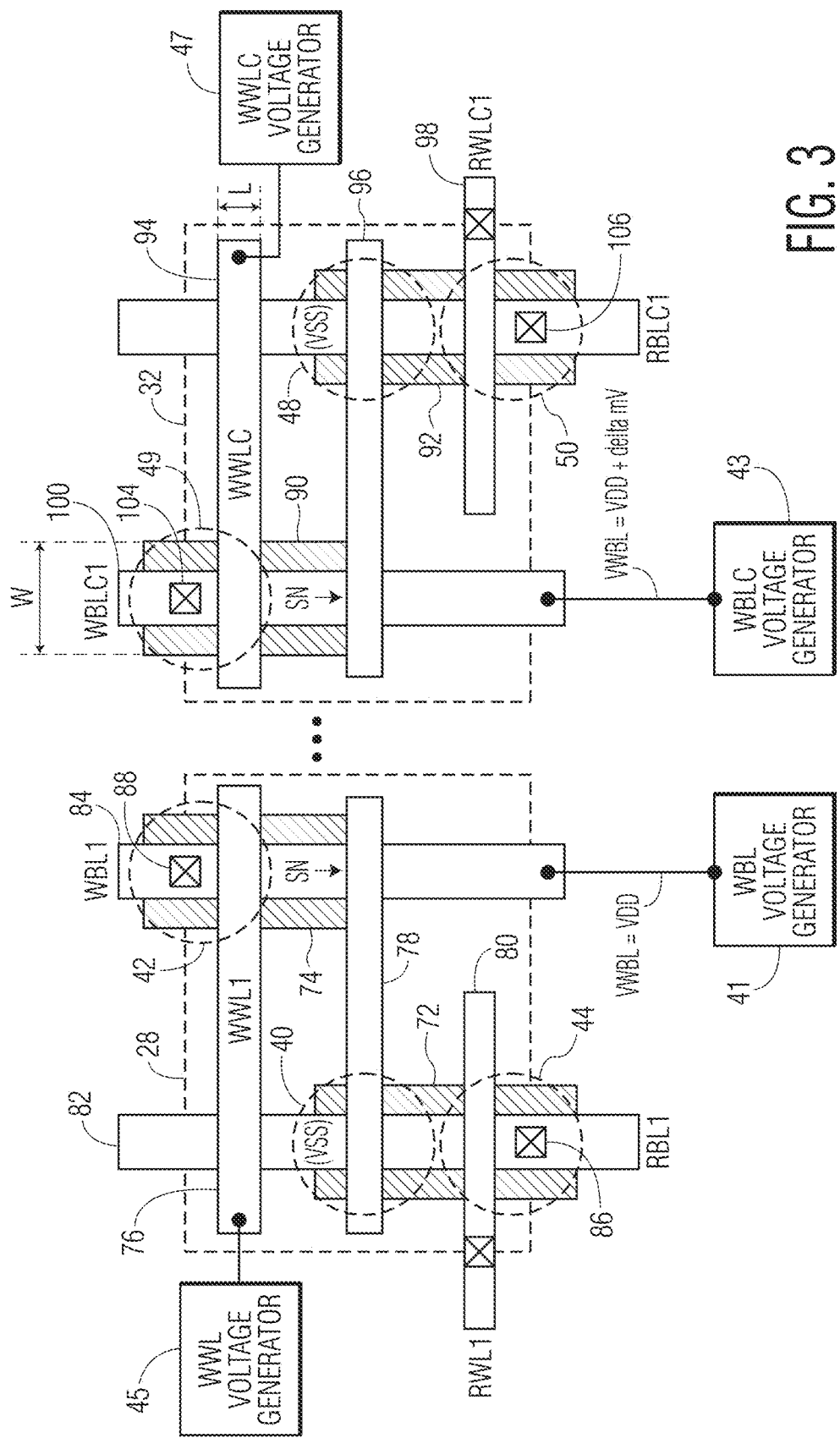
FIG. 3 illustrates, in layout form, a data bit cell and a canary bit cells of the DRAM of FIG. 1, in accordance with an embodiment of the present invention.
Figure 4:
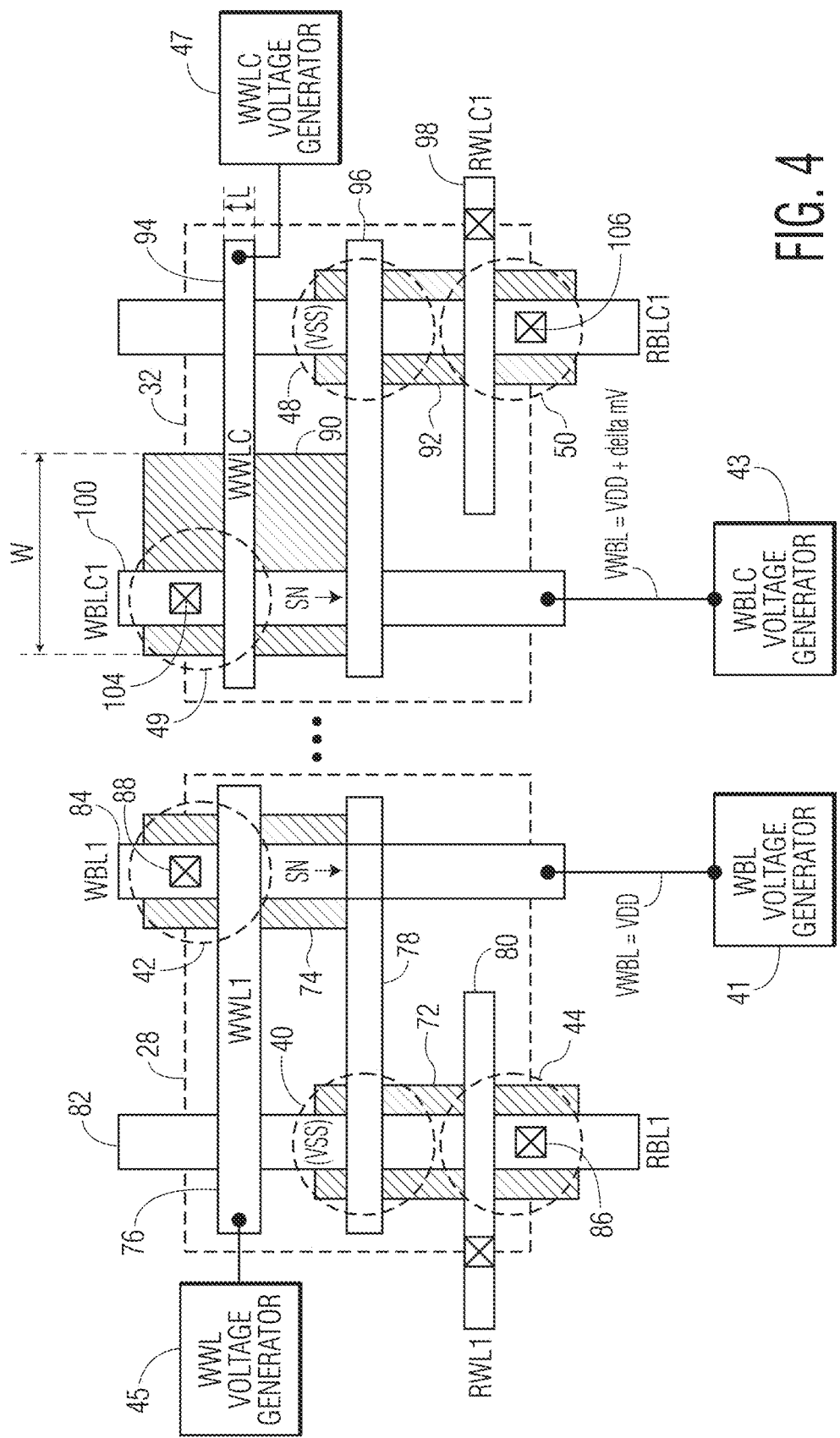
FIG. 4 illustrates, in layout form, a data bit cell and a canary bit cells of the DRAM of FIG. 1, in accordance with an embodiment of the present invention.

FIGS. 3 and 4 provide examples, in layout form, of designs for canary cells (which can be applied to each canary cell of canary cells 16) as compared to the main bit cells. Each of FIGS. 3 and 4 illustrates a simplified example layout of a main bit cell (e.g. bit cell 28) in a same row as a canary cell (e.g. canary cell 32). Bit cell 28 is being used as the example even though bit cell 28, as illustrated in FIG. 1, is not the main cell which abuts canary cell 32, but the description for bit cell 28 applies to each of the main cells in main array 14 just as the description for canary cell 32 applies to each of the canary cells of canary cells 16. Referring to FIG. 3, bit cell 28 includes a (hatched) diffusion region 72 corresponding to transistors 40 and 44 and a (hatched) diffusion region 74 corresponding to transistor 42. Horizontal conductive material 76 overlies a portion of diffusion region 74 forming the gate of transistor 42 and corresponds to WWL1, horizontal conductive material 78 overlies a portion of diffusion region 72 forming the gate of transistor 40, and horizontal conductive material 80 overlies a portion of diffusion region 72 forming the gate of transistor 44 and corresponds to RWL1. Vertical conductive material 82 overlies diffusion region 72 and connects to the second current electrode of transistor 44 via contact 86 and corresponds to RBL1. Vertical conductive material 84 overlies diffusion region 74 and connects to the first current electrode of transistor 42 via contact 88 and corresponds to WBL1. In one embodiment, the conductive material includes polysilicon, but alternatively, may include other conductive materials, such as a metal.

Referring to canary cell 32, canary cell 32 includes a (hatched) diffusion region 92 corresponding to transistors 48 and 50 and a (hatched) diffusion region 90 corresponding to transistor 49. Horizontal conductive material 94 overlies a portion of diffusion region 90 forming the gate of transistor 49 and corresponds to WWLC, horizontal conductive material 96 overlies a portion of diffusion region 92 forming the gate of transistor 48, and horizontal conductive material 98 overlies a portion of diffusion region 92 forming the gate of transistor 50 and corresponds to RWLC1. Vertical conductive material 102 overlies diffusion region 92 and connects to the second current electrode of transistor 50 via contact 106 and corresponds to RBLC1. Vertical conductive material 100 overlies diffusion region 90 and connects to the first current electrode of transistor 49 via contact 104 and corresponds to WBLC1. In one embodiment, the conductive material includes polysilicon, but alternatively, may include other conductive materials, such as a metal. Alternatively, other layouts for the cells may be used, such as layouts with different forms and shapes, other materials, with additional doped regions, etc., as needed and as known in the art.

In the illustrated embodiment of FIG. 3, "W" refers to the width of transistor 49 and "L" refers to the length (i.e. channel length) of transistor 49. For example, the width of transistor 49 corresponds to the width of the overlapping portions of horizontal conductive material 94 and underlying diffusion region 90, in which the portions of diffusion region 90 above and below conductive material 94 correspond to the current electrodes, e.g. source/drain regions, of transistor 49. The length of transistor 49 corresponds to the length of the channel (the distance between the current electrodes of transistor 49 under conductive portion 94). Note that in the illustrated embodiment, the width and length of the write access transistors of the canary cell and main cell (e.g. transistors 49 and 42) are the same. However, VWBL of main cell 28 (i.e. the voltage on WBL1) can be set to VDD while VWBL of canary cell 32 (i.e. the voltage on WBLC1) can be set to some delta voltage higher than VDD (i.e. to VDD+delta mv). Therefore, in one embodiment, memory 10 may include multiple voltage generators (e.g. voltage regulators), in which a WBL voltage generator 41 controls the voltage on WBL1 and a WBLC voltage generator 43, independent of voltage generator 41, controls the voltage on WBLC1. Also, in one embodiment, WBL voltage generator 41 controls the voltage on WBL1-k, while WBLC voltage generator 43 controls the voltage on WBLC1 and WBLC2. In this example, WWL1 and WWLC can be connected such that they form portions of a same continuous conductive material, as illustrated in FIG. 1. With WBLC at a higher voltage than WBL1, though, note that canary cell 32 will be more susceptible to leakage as compared to main cell 28.

In one example, in which WWL1 and WWLC are connected (such that they form a same word line), a WWL voltage generator 45 controls the voltage on both WWL1 and WWLC. In another example in which WWL1 and WWLC are segmented as illustrated in FIG. 3 such that each of WWL1 and WWLC can be set to different voltages, the voltage on WWLC can be set to a higher voltage as compared to the voltage on WWL1 in order to make canary cell 28 more susceptible to leakage as compared to main cell 28. In this embodiment, memory 10 may include additional voltage generators, as needed, such as a WWLC voltage generator 47 to provide a voltage onto WWLC which is independent of the voltage on WWL1 provided by WWL voltage generator 45. Also, in alternate embodiments, the voltage generators may be located anywhere within memory 10 in which the voltage values can be controlled by, e.g., control circuit 20. Any type of voltage generator or regulator may be used to implement voltage generators 41, 42, 45, and 47.

FIG. 4 also illustrates a simplified example layout for each of bit cell 28 and canary cell 32, but in accordance with a different embodiment in which the width and length of the write access transistor of the canary cell are different than those of the main cell. In the illustrated embodiment of FIG. 4, in order to make canary cell more susceptible to leakage as compared to the main cell, the width of transistor 49 is increased (by, e.g., increasing the width of diffusion region 110 as compared to diffusion region 90 of FIG. 3) or the length of transistor 49 is decreased (by, e.g., narrowing conductive material 112 as compared to conductive material 94 of FIG. 4). Alternatively, both the width of the write access transistor may be increased and the length decreased. In one embodiment, in addition to increasing the width, narrowing the length, or both increasing the width and narrowing the length, the voltage on WBLC1 can be set higher as compared to the voltage on WBL1 (i.e. the voltage on WLBC1 can also be set to VDD+delta mV). Therefore, there are many ways or combination of ways in which to adjust or tune canary cells 16 to make them more susceptible to leakage as compared to the bit cells of main array 14. As with the example of FIG. 3, other layouts for the cells may be used, such as layouts with different forms and shapes, other materials, with additional doped regions, etc., as needed and as known in the art.

Figure 5:
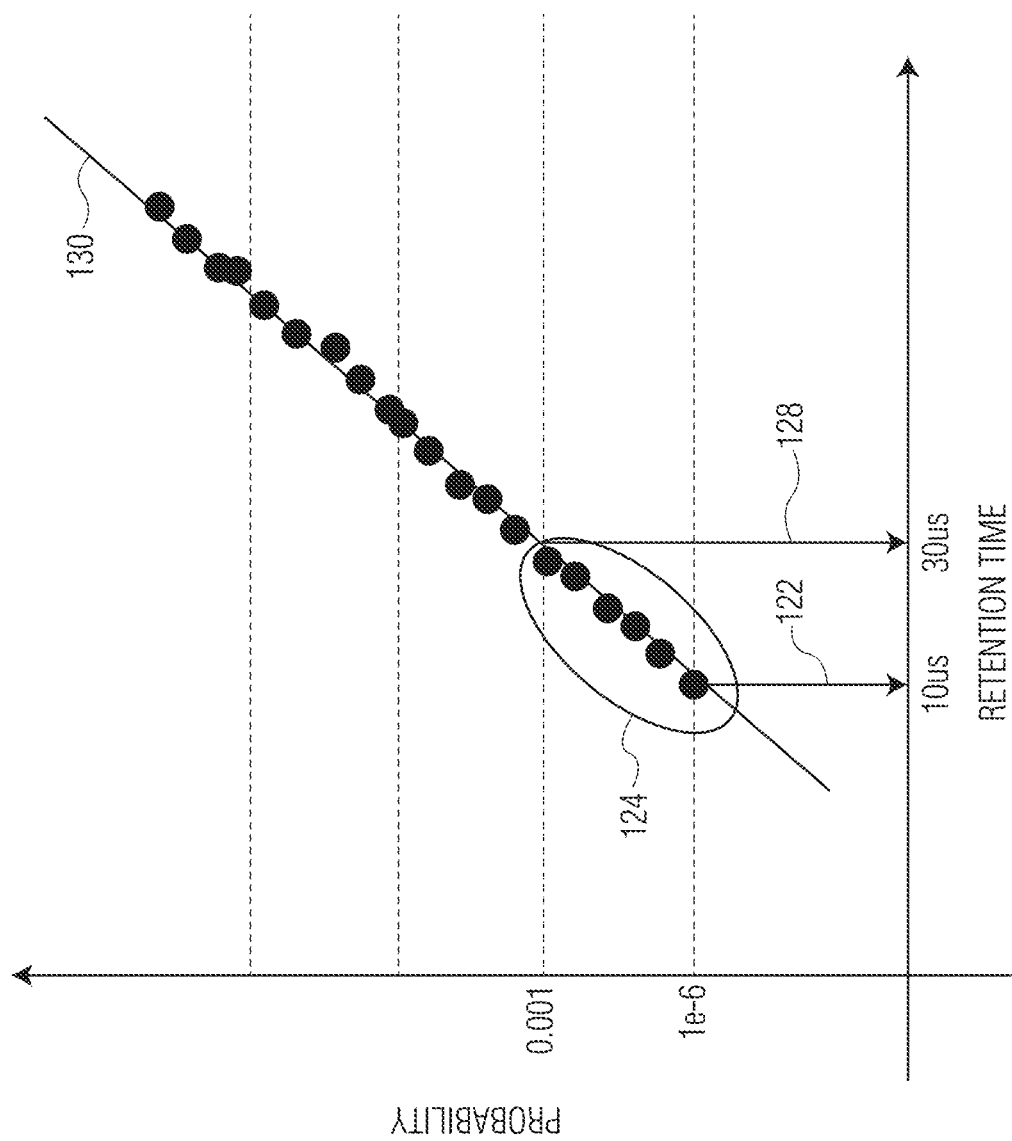
FIG. 5 illustrates a DRAM retention time probability distribution in accordance with one embodiment of the present invention.
Figure 6:
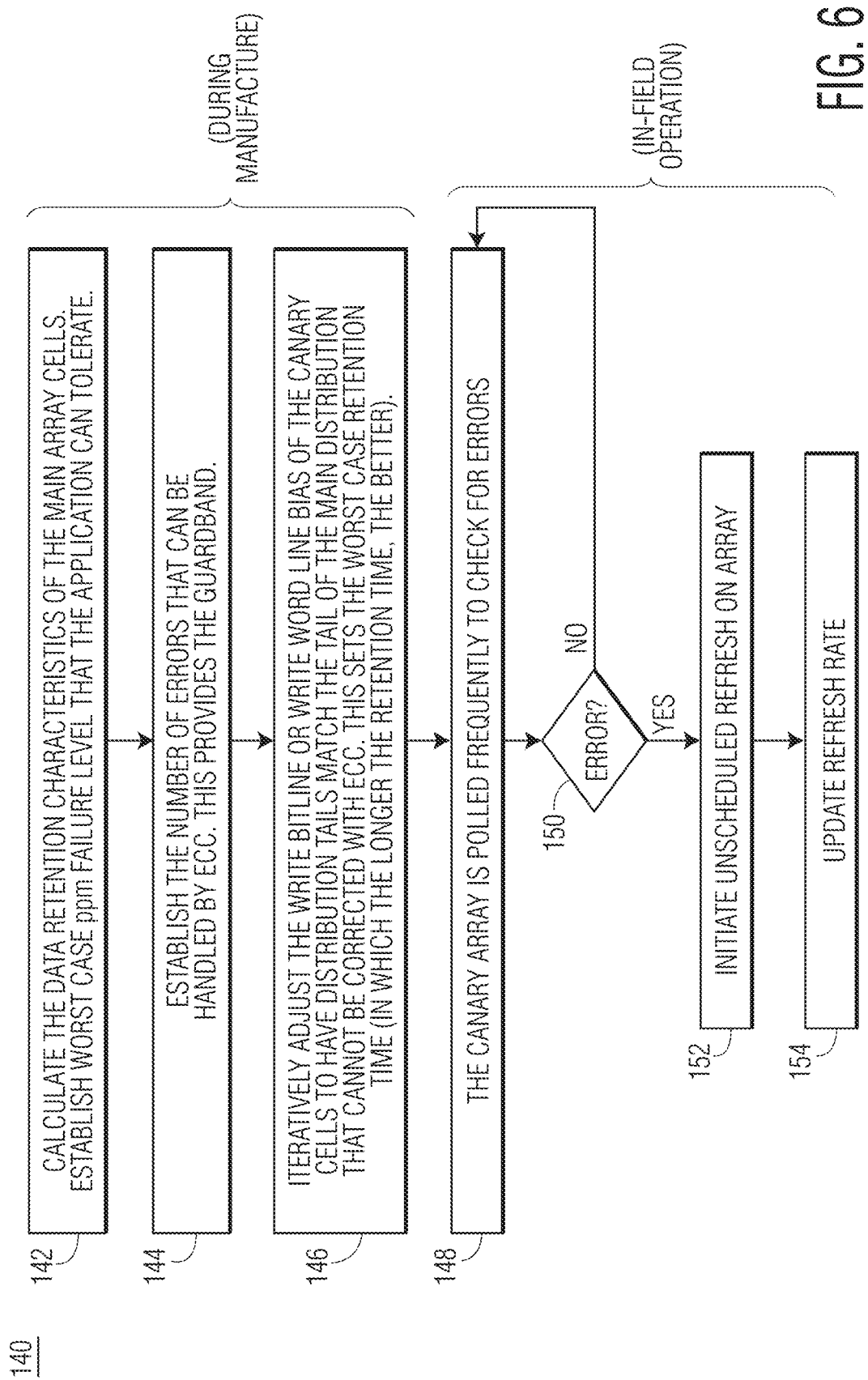
FIG. 6 illustrates, in flow diagram form, a method for canary selecting and polling for use with the DRAM of FIG. 1, 3, or 4, in accordance with an embodiment of the present invention.

FIG. 5 illustrates an example distribution of data retention characteristics (which is influenced by leakage currents) for main array 14, in accordance with one embodiment of the present invention, and FIG. 6 illustrates, in flow diagram form, a method 140 of operating DRAM 10 with canary cells 16 in accordance with one embodiment of the present invention. In FIG. 5, each dot represents a bit cell in main array 14 in which the vertical axis reflects the probability and the horizontal axis reflects the retention time required to prevent data loss. The probability refers to the number of errors per unit memory size at each value of retention time. In one embodiment, during manufacture and prior to use in the field (e.g. blocks 142, 144, and 146 of FIG. 6), main array 14 can be characterized to determine the data retention characteristics (block 142 of FIG. 6), which may result in the plot of FIG. 5, in which a worst case failure level (e.g. parts-per-million (PPM) level) for the part can also be established. As can be seen in FIG. 5, the worst case refresh rate (corresponding to the worst case retention time) is set by the worst case bit (the tailing bit). As indicated by arrow 122, the worst case bit sets the worst case retention time to 10 microseconds (us) (thus the required refresh rate to prevent data loss in main array 14 is at least one refresh every 10 us). However, ECC may be applied to main array 14 in which, depending on the strength of the available ECC algorithm, can handle a particular number of errors in the array. Therefore, in one embodiment, based on the strength of the ECC (e.g. number of errors or PPM level that can be handled by ECC), the bits of tailing portion 124 of FIG. 5 which are correctable by ECC are identified (block 144 of FIG. 6). This provides a guardband for retention. That is, if portion 124 can be handled (i.e. is correctable by) ECC, then a greater retention time is achievable. As illustrated by arrow 128 of FIG. 5, the increased retention time without tail portion 124 is 30 us, allowing for a lower refresh rate (one refresh every 30 microseconds rather than every 10 microseconds). Note that the greater the strength of the ECC algorithm, a greater number of errors can be handled. For example, a 2-bit correction and 3-bit detection ECC algorithm will be able to handle fewer errors as compared to a 3-bit correction and 4-bit detection ECC algorithm, but stronger ECC algorithms are more complex and increase access latency.

Therefore, in one embodiment, during manufacture, after characterizing main array 14 and establishing the number of errors which can be handled by ECC (in which any ECC may be used within a device), the canary cells can be iteratively tuned or adjusted (block 146 of FIG. 6) until canary cells 16 achieve a distribution tail which matches the tail of the distribution of main cells 14 which cannot be corrected with ECC. This can therefore be used to set a better (i.e. increased) retention time. Referring to FIG. 5, since portion 124 can be corrected by ECC, the canary cells can be tuned until the distribution of canary cells matches line 130. For example, the voltage on WBLC1 or WBLC2 provided by voltage generator 43 (or the voltage on WWLC, if segmented from WWL, provided by voltage generator 47) can be iteratively increased until the distribution matches line 130 in which tail bits 124 can be corrected by ECC. The retention time for canary cells 16 is therefore set to the greater 30 microseconds as opposed to the worst case 10 microseconds. That is, by tuning the canary cells, the failure level is identified below which ECC correction can happen. In FIG. 5, this failure level corresponds to the 0.001 probability. This identifies a retention rate of 30 microseconds (corresponding to the point when the failure level at 0.001 intersects distribution 124, as indicated by arrow 128).

Note that a retention time of less than 30 microseconds will cause bits of canary cells 16 to fail, but will not yet cause bits of main array 14 to fail. That is, failure of a canary cell provides a warning of impending failure of main array 14. In this example, the refresh rate determined based on the 30 microsecond retention rate can be stored within DRAM 10 (e.g. within refresh control circuit 39). This characterization and determination of initial refresh rate can be done on a per device basis during manufacture, prior to use in the field, in which, when in use in the field, the initial refresh rate is used for performing refreshes of array 12. Also, note that, depending on the embodiment or device, one of a stored one logic state of or stored zero logic state of zero canary cells may experience worse leakage than the other. In one embodiment, the logic state with the worse leakage is selected for storage into all canary cells. Therefore, this selected logic state may be stored within refresh control circuit 39, in addition to the determined initial refresh rate. Also, the worst-case refresh rate may also be stored within refresh control circuit 39.

After manufacture and during operation in the field (e.g. blocks 148, 152, and 154 of FIG. 6, canary cells 16 can be polled to check for errors (block 148). For example, in one embodiment, upon reset, all canary cells 16 are written with the same predetermined logic state (e.g. all zeros or all ones). As described above, the selected predetermined logic state may correspond to the logic state more susceptible to leakage. The writing to canary cells 16 can be done by performing a write to each row of array 12 while masking the bits corresponding to main array 14 such that only the canary cells of each row are written. Alternatively, other method may be used to write to the canary cells 16, upon reset, in which the writes can be performed as known in the art. Since canary cells 16 are all written to the same predetermined logic state, they can be polled with each read from main array 14. For example, with each read, selected cells of a selected row are sensed from main array 14, along with the canary cells in the selected row. The sensed canary bits (e.g. C1 and C2) for each read can therefore be compared to each other (such as with the use of an XOR or XNOR logic gate within refresh control circuit 39) to determine whether or not they still store the same state. If not, then at least one of the canary bits failed and lost its stored data, providing a warning to refresh control circuit 39 that an uncorrectable failure has occurred in canary cells 16 which may therefore indicate an impending data retention failure with main array 14. Since canary cells 16 have been tuned during manufacture, it is known that any failure with canary cells 16 indicates a failure in the main array cells that cannot be handled or corrected by ECC. In alternate embodiments, canary cells 16 can be polled periodically or at other times during operation to determine errors.

If, when polled, any errors are found in canary cells 16 (at decision diamond 150), one or more actions can be taken. In one example, at block 152, an unscheduled refresh can be initiated on array 12. In this manner, an immediate refresh is performed to ensure no data is lost in main array 14. In one embodiment, at block 154, the refresh rate is updated such that refreshes are performed more often. The refresh rate can be updated multiple times over time, until reaching the worst-case refresh rate. However, the reduced refresh rates as compared to the worst-case refresh rate each allow for reduced overall power consumption.

Figure 7:
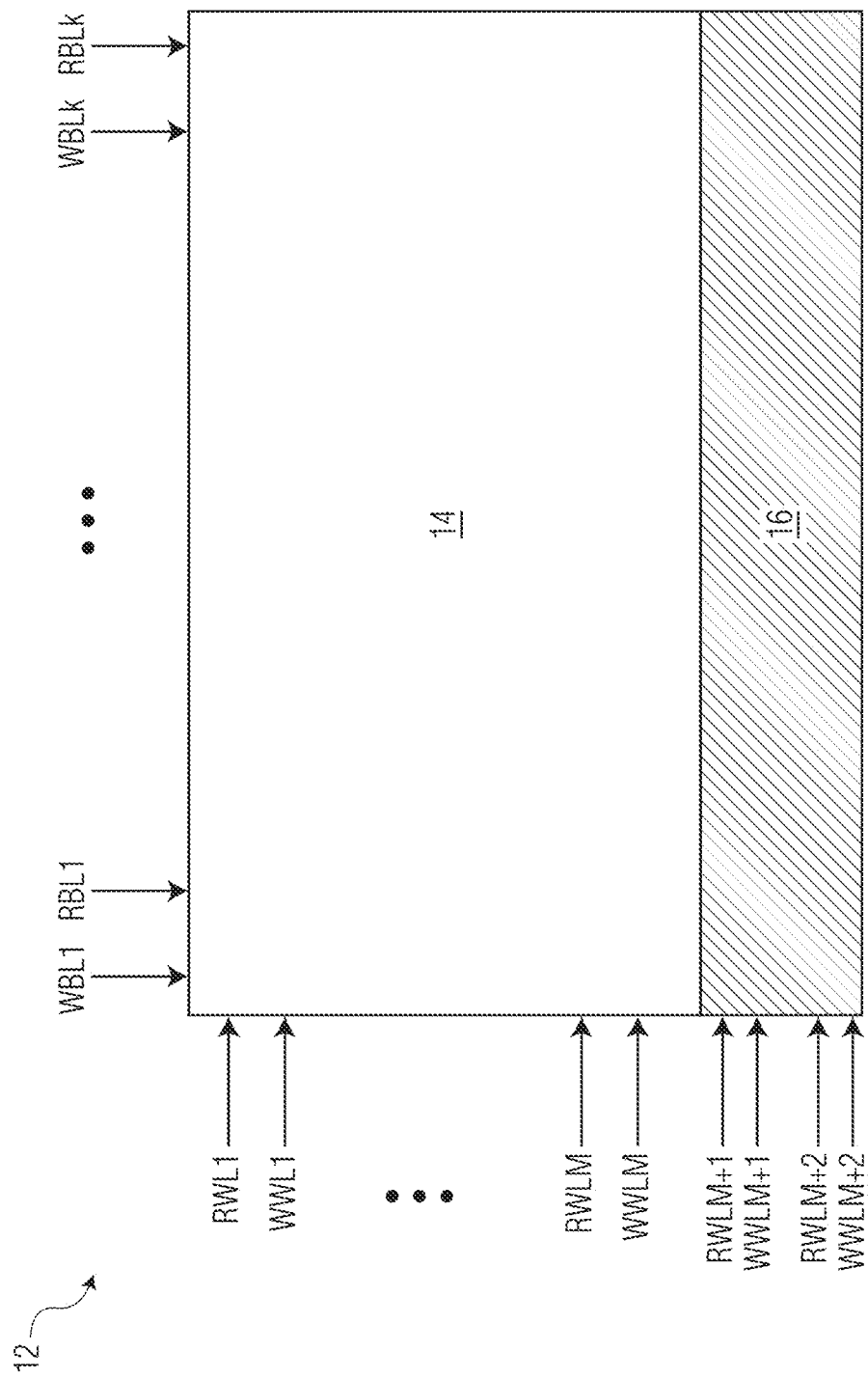
FIG. 7 illustrates, in block diagram form, embedded DRAMs with canary cells, in accordance with an embodiment of the present invention.

FIG. 7 illustrates, in block diagram form, an alternate embodiment of array 12 of DRAM 10. As illustrated in FIG. 7, canary cells may be located at different locations within array 12. For example, rather than having one or more canary cells in each row of array 12, one or more rows may instead be dedicated to just canary cells. In this case, the WWLs for the canary rows (e.g. WWLM+1, WWLM+2, etc.) can be set at different voltages by row decoder 18 as compared to WWL1-M in order to make the canary cells more susceptible to leakage. Also, the canary cells can be polled during operation by reading these canary cell rows of array 12 and comparing the read bits to see if they are all the same or not. In yet other embodiments, canary cells 16 can be located in yet different places within array 12, or may even be implemented as an all together separate array of canary cells which is used in combination with main array 14. In this embodiment, the separate array of canary cells would have its own associated decoders, precharge and refresh circuits, and read/write circuitry.

Therefore, by now it can be appreciated how canary cells corresponding to a main array of an eDRAM can be used to improve management of refresh operations. For example, the canary cells can be biased or designed such that they are more susceptible to leakage currents as compared to the main cells. This allows for the canary cells to be tuned as needed to identify a level below which ECC can properly handle errors. In this manner, reduced refresh rates can initially be determined for each memory. Further, the canary cells can be polled during operation to determine whether additional refresh operations are needed or to increase the refresh rate, as needed, to prevent data loss. In one embodiment, the canary cells are tuned by adjusting a bias voltage applied to the write bit lines of the canary cells, to the write word lines of the canary cells. or to both, in which this adjusting can be done independently of the voltages applied to the write bit lines and write word lines of the main array. In one embodiment, in addition to or instead of adjusting the bias voltages, transistor dimensions of the bias cell can be designed differently as compared to the transistor dimensions used in the main cells. Regardless of how the canary cells are made to be more susceptible to leakage as compared to the main cells, the canary cells can be designed so that they still fit within the same pitch as the main cells, for easy integration into a main array of a DRAM.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterisk (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Some of the above embodiments, as applicable, may be implemented using a variety of different information processing systems. For example, although FIG. 1 and the discussion thereof describe an exemplary information processing architecture and exemplary memory system, these are presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Also for example, in one embodiment, the illustrated elements of DRAM 10 are circuitry located on a single integrated circuit or within a same device, and is also located on the same integrated circuit or same device as the data processing system in which it is embedded. Alternatively, the information processing system may include any number of separate integrated circuits or separate devices interconnected with each other.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, the bit cells and reference bit cells of DRAM 10 may all be formed with a different type of DRAM bit cell using a capacitive storage elements and 2, 3, 4, or more transistors. Further, any type of device configuration may be used to implement the capacitive elements of the bit cells, or any parasitic capacitance may instead be used to implement the capacitive elements. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention. Note that any of the aspects below can be used in any combination with each other and with any of the disclosed embodiments.

In an embodiment, a dynamic random access memory (DRAM) includes a plurality of main bit cells, each with a capacitive storage element; a first set of write bit lines and a first set of write word lines, wherein each main bit cell is coupled to a corresponding write bit line of the first set of bit lines and a corresponding write word line of the first set of write word lines; a plurality of canary cells, each having a capacitive storage element, wherein the plurality of canary cells are configured to be more susceptible to leakage currents as compared the plurality of main bit cells; and a second set of write bit lines and a second set of write word lines, wherein each canary cell is coupled to a corresponding write bit line of the second set of bit lines and a corresponding write word line of the second set of write word lines. In one aspect, the DRAM further includes a first voltage generator coupled to provide a same write bit line voltage to each write bit line of the first set of write bit lines during a write operation, and a second voltage generator coupled to provide a higher write bit line voltage to each write bit line of the second set of write bit lines such that canary cells coupled to receive the higher write bit line voltage are more susceptible to leakage as compared to main bit cells coupled to receive the same bit line voltage. In a further aspect, the second voltage generator is configured to provide multiple write bit line voltages to each write bit line of the second set of write bit lines, wherein the higher write bit line voltage is one of the multiple write bit line voltages. In another further aspect, each write word line of the first set of write word lines has a corresponding write word line in the second set of write word lines, wherein each write word line of the first set of write word lines is segmented from the second set of write word lines. In yet a further aspect, the DRAM further includes a third voltage generator coupled to provide a write word line voltage to a selected word line of the first set of word lines during a write operation, and a fourth voltage generator coupled to provide a higher write word line voltage to each write word line of the second set of write word lines such that canary cells coupled to receive the higher write word line voltage are more susceptible to leakage as compared to main bit cells coupled to receive the write word line voltage. In another aspect of the embodiment, each write word line of the first set of write word lines has a corresponding write word line in the second set of write word lines, wherein each write word line of the first set of write word lines is segmented from the second set of write word lines. In a further aspect, the DRAM further includes a first voltage generator coupled to provide a write word line voltage to a selected word line of the first set of word lines during a write operation, and a second voltage generator coupled to provide a higher write word line voltage to each write word line of the second set of write word lines. In yet another aspect of the embodiment, the DRAM further includes a refresh circuit configured to perform refreshes of the plurality of main bit cells and the plurality of canary cells in accordance with a refresh rate; and a control circuit configured to write a same logic state into each canary cell of the plurality of canary cells and configured to poll at least a portion of the plurality of canary cells to determine whether or not sensed logic states are the same logic state. In a further aspect, the plurality of main bit cells are implemented as an array in which the first set of write word lines correspond to rows of the array and the first set of write bit lines correspond to columns of the array, wherein each row of the array includes at least one canary cell of the plurality of canary cells. In yet a further aspect, the control circuit is configured to poll the at least a portion of the plurality of canary cells by, during a read operation from the array, sensing logic states of the at least one canary cell located along a selected word line for the read operation. In another further aspect, the plurality of main bit cells are implemented as an array in which the first set of write word lines corresponds to a first set of rows of the array, the second set of write word lines corresponds to additional rows of the array in addition to the first set of rows, and the first set of write bit lines correspond to columns of the array, wherein the first set of bit lines and the second set of bit lines are a same set of bit lines. In yet a further aspect, the control circuit is configured to poll the at least a portion of the plurality of canary cells by performing a read operation from a selected word line of the second set of word lines to sense the logic states of canary cells located along the selected word line. In another further aspect, the control circuit is configured to, when the sensed logic states during polling are not all the same logic state, update the refresh rate for the refresh circuit to a higher refresh rate. In yet a further aspect, the control circuit is further configured to, when the sensed logic states during polling are not all the same logic state, direct the refresh circuit to perform an unscheduled refresh of the plurality of main bit cells and the plurality of canary cells. In another further aspect, the control circuit is configured to, when the sensed logic states during polling are not all the same logic state, direct the refresh circuit to perform an unscheduled refresh of the plurality of main bit cells and the plurality of canary cells. In yet another further aspect, the control circuit is configured to write the same logic state into each canary cell of the plurality of canary cells with each reset of the DRAM. In another aspect of the embodiment, each main bit cell of the plurality of main bit cells and each canary cell of the plurality of canary cells includes an access transistor at the intersection of a corresponding word line and corresponding bit line, wherein the access transistors of the plurality of canary cells has a larger transistor width as compared to the access transistors of the plurality of main bit cells such that each canary cell is more susceptible to leakage as compared to any of the main bit cells. In yet another aspect of the embodiment, each main bit cell of the plurality of main bit cells and each canary cell of the plurality of canary cells includes an access transistor at the intersection of a corresponding word line and corresponding bit line, wherein the access transistors of the plurality of canary cells has a larger channel length as compared to the access transistors of the plurality of main bit cells such that each canary cell is more susceptible to leakage as compared to any of the main bit cells.

In another embodiment, a DRAM includes a plurality of main bit cells, each with a capacitive storage element; a first set of write bit lines and a first set of write word lines, wherein each main bit cell is coupled to a corresponding write bit line of the first set of bit lines and a corresponding write word line of the first set of write word lines; a plurality of canary cells, each having a capacitive storage element; a second set of write bit lines and a second set of write word lines, wherein each canary cell is coupled to a corresponding write bit line of the second set of bit lines and a corresponding write word line of the second set of write word lines; a voltage generator configured to provide a selected one of multiple write bit line voltages to each write bit line of the second set of write bit lines, wherein the selected one of the multiple write bit line voltages provides a higher write bit line voltage to each write bit line of the second set of write bit lines as compared to a write bit line voltage provided to each write bit line of the first set of write bit lines during a write operation such that canary cells coupled to receive the higher write bit line voltage are more susceptible to leakage as compared to any of the main bit cells of the plurality of main bit cells; a refresh circuit configured to perform refreshes of the plurality of main bit cells and the plurality of canary cells in accordance with a refresh rate; and a control circuit configured to write a same logic state into each canary cell of the plurality of canary cells and configured to poll at least a portion of the plurality of canary cells to determine whether or not sensed logic states are the same logic state. In one aspect of the another embodiment, the voltage generator is configured to select among the multiple write bit line voltages to provide to each write bit line of the second set of write bit lines based on a desired retention time for the plurality of canary cells, wherein the refresh circuit is configured to store the refresh rate corresponding to the selected one of the multiple write bit line voltages. In a further aspect, the control circuit is configured to, when the sensed logic states during polling are not all the same logic state, update the stored refresh rate for the refresh circuit to a higher refresh rate.

What is claimed is:

1. A dynamic random access memory (DRAM), comprising:
   a plurality of main bit cells, each with a capacitive storage element;
   a first set of write bit lines and a first set of write word lines, wherein each main bit cell is coupled to a corresponding write bit line of the first set of write bit lines and a corresponding write word line of the first set of write word lines;
   a plurality of canary cells, each having a capacitive storage element, wherein the plurality of canary cells are configured to be more susceptible to leakage currents as compared the plurality of main bit cells; and
   a second set of write bit lines and a second set of write word lines, wherein each canary cell is coupled to a corresponding write bit line of the second set of write bit lines and a corresponding write word line of the second set of write word lines.

2. The DRAM of claim 1, further comprising:
   a first voltage generator coupled to provide a same write bit line voltage to each write bit line of the first set of write bit lines during a write operation, and
   a second voltage generator coupled to provide a higher write bit line voltage to each write bit line of the second set of write bit lines such that canary cells coupled to receive the higher write bit line voltage are more susceptible to leakage as compared to main bit cells coupled to receive the same bit line voltage.

3. The DRAM of claim 2, wherein the second voltage generator is configured to provide multiple write bit line voltages to each write bit line of the second set of write bit lines, wherein the higher write bit line voltage is one of the multiple write bit line voltages.

4. The DRAM of claim 2, wherein each write word line of the first set of write word lines has a corresponding write word line in the second set of write word lines, wherein each write word line of the first set of write word lines is segmented from the second set of write word lines.

5. The DRAM of claim 4, further comprising:
a third voltage generator coupled to provide a write word line voltage to a selected word line of the first set of word lines during a write operation, and
a fourth voltage generator coupled to provide a higher write word line voltage to each write word line of the second set of write word lines such that canary cells coupled to receive the higher write word line voltage are more susceptible to leakage as compared to main bit cells coupled to receive the write word line voltage.

6. The DRAM of claim 1, wherein each write word line of the first set of write word lines has a corresponding write word line in the second set of write word lines, wherein each write word line of the first set of write word lines is segmented from the second set of write word lines.

7. The DRAM of claim 6, further comprising:
a first voltage generator coupled to provide a write word line voltage to a selected word line of the first set of word lines during a write operation, and
a second voltage generator coupled to provide a higher write word line voltage to each write word line of the second set of write word lines.

8. The DRAM of claim 1, further comprising:
a refresh circuit configured to perform refreshes of the plurality of main bit cells and the plurality of canary cells in accordance with a refresh rate; and
a control circuit configured to write a same logic state into each canary cell of the plurality of canary cells and configured to poll at least a portion of the plurality of canary cells to determine whether or not sensed logic states are the same logic state.

9. The DRAM of claim 8, wherein the plurality of main bit cells are implemented as an array in which the first set of write word lines correspond to rows of the array and the first set of write bit lines correspond to columns of the array, wherein each row of the array includes at least one canary cell of the plurality of canary cells.

10. The DRAM of claim 9, the control circuit is configured to poll the at least a portion of the plurality of canary cells by, during a read operation from the array, sensing logic states of the at least one canary cell located along a selected word line for the read operation.

11. The DRAM of claim 8, wherein the plurality of main bit cells are implemented as an array in which the first set of write word lines corresponds to a first set of rows of the array, the second set of write word lines corresponds to additional rows of the array in addition to the first set of rows, and the first set of write bit lines correspond to columns of the array, wherein the first set of bit lines and the second set of bit lines are a same set of bit lines.

12. The DRAM of claim 11, the control circuit is configured to poll the at least a portion of the plurality of canary cells by performing a read operation from a selected word line of the second set of word lines to sense the logic states of canary cells located along the selected word line.

13. The DRAM of claim 8, wherein the control circuit is configured to, when the sensed logic states during polling are not all the same logic state, update the refresh rate for the refresh circuit to a higher refresh rate.

14. The DRAM of claim 8, wherein the control circuit is configured to, when the sensed logic states during polling are not all the same logic state, direct the refresh circuit to perform an unscheduled refresh of the plurality of main bit cells and the plurality of canary cells.

15. The DRAM of claim 8, wherein the control circuit is configured to write the same logic state into each canary cell of the plurality of canary cells with each reset of the DRAM.

16. The DRAM of claim 1, wherein each main bit cell of the plurality of main bit cells and each canary cell of the plurality of canary cells includes an access transistor at the intersection of a corresponding word line and corresponding bit line, wherein the access transistors of the plurality of canary cells has a larger transistor width as compared to the access transistors of the plurality of main bit cells such that each canary cell is more susceptible to leakage as compared to any of the main bit cells.

17. The DRAM of claim 1, wherein each main bit cell of the plurality of main bit cells and each canary cell of the plurality of canary cells includes an access transistor at the intersection of a corresponding word line and corresponding bit line, wherein the access transistors of the plurality of canary cells has a larger channel length as compared to the access transistors of the plurality of main bit cells such that each canary cell is more susceptible to leakage as compared to any of the main bit cells.

18. A dynamic random access memory (DRAM), comprising:
a plurality of main bit cells, each with a capacitive storage element;
a first set of write bit lines and a first set of write word lines, wherein each main bit cell is coupled to a corresponding write bit line of the first set of write bit lines and a corresponding write word line of the first set of write word lines;
a plurality of canary cells, each having a capacitive storage element;
a second set of write bit lines and a second set of write word lines, wherein each canary cell is coupled to a corresponding write bit line of the second set of write bit lines and a corresponding write word line of the second set of write word lines;
a voltage generator configured to provide a selected one of multiple write bit line voltages to each write bit line of the second set of write bit lines, wherein the selected one of the multiple write bit line voltages provides a higher write bit line voltage to each write bit line of the second set of write bit lines as compared to a write bit line voltage provided to each write bit line of the first set of write bit lines during a write operation such that canary cells coupled to receive the higher write bit line voltage are more susceptible to leakage as compared to any of the main bit cells of the plurality of main bit cells;
a refresh circuit configured to perform refreshes of the plurality of main bit cells and the plurality of canary cells in accordance with a refresh rate; and
a control circuit configured to write a same logic state into each canary cell of the plurality of canary cells and configured to poll at least a portion of the plurality of canary cells to determine whether or not sensed logic states are the same logic state.

19. The DRAM of claim 18, wherein the voltage generator is configured to select among the multiple write bit line voltages to provide to each write bit line of the second set of write bit lines based on a desired retention time for the plurality of canary cells, wherein the refresh circuit is configured to store the refresh rate corresponding to the selected one of the multiple write bit line voltages.

20. The DRAM of claim 19, wherein the control circuit is configured to, when the sensed logic states during polling are not all the same logic state, update the stored refresh rate for the refresh circuit to a higher refresh rate.

\* \* \* \* \*